(12) United States Patent
Brown

(10) Patent No.: US 9,557,747 B2
(45) Date of Patent: Jan. 31, 2017

(54) GAS FLOW REGULATOR WITH MULTIPLE GAS FLOW PASSAGES

(75) Inventor: Michael D. Brown, Buford, GA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1504 days.

(21) Appl. No.: 12/978,352

(22) Filed: Dec. 23, 2010

(65) Prior Publication Data

US 2012/0161057 A1    Jun. 28, 2012

(51) Int. Cl.
*F16K 37/00*    (2006.01)
*G05D 16/04*    (2006.01)

(52) U.S. Cl.
CPC .......... *G05D 16/04* (2013.01); *F16K 37/0008* (2013.01)

(58) Field of Classification Search
USPC .... 137/552, 557; 73/861.55, 861.56, 861.57, 73/199
See application file for complete search history.

(56) References Cited

U.S. PATENT DOCUMENTS

| | | | |
|---|---|---|---|
| 3,066,530 A * | 12/1962 | Stenberg | 73/203 |
| 3,633,416 A | 1/1972 | Van Dyke et al. | |
| 3,751,971 A * | 8/1973 | Wilcox | 73/37.9 |
| 4,174,733 A | 11/1979 | Eidsmore et al. | |
| 4,317,375 A * | 3/1982 | Egert | 73/861.55 |
| 5,398,721 A | 3/1995 | Pryor | |
| 5,678,602 A | 10/1997 | Cannet et al. | |
| 5,760,301 A | 6/1998 | Shuman, Jr. | |
| 6,484,750 B1 | 11/2002 | Foos et al. | |
| 2002/0023648 A1 | 2/2002 | Komesaroff | |
| 2004/0094153 A1 | 5/2004 | Zaiser et al. | |
| 2008/0053255 A1 | 3/2008 | Furey et al. | |
| 2009/0166226 A1 | 7/2009 | Radford et al. | |
| 2009/0171507 A1 | 7/2009 | Ohmi et al. | |
| 2009/0301581 A1 | 12/2009 | MacNeal et al. | |

FOREIGN PATENT DOCUMENTS

WO    9600883    1/1996

OTHER PUBLICATIONS

BOC Flowmeter; www.gassafegear.com; 2008.
Pressure Regulator Eco with Integrated Gas Economizer; Gloor Bros.; 2006.
Western Enterprises REF Series Flowmeter Regulators; The Betty Mills Co.; 2010.
Harris; Harris Launches New Shielding Gas Flow Meter Regulator; "Model 351 Shielding Gas Flow Meter Regulators"; 2010; www.harrisproductsgroup.com.

* cited by examiner

*Primary Examiner* — Craig Schneider
*Assistant Examiner* — Angelisa L Hicks
(74) *Attorney, Agent, or Firm* — Perkins Coie LLP

(57) ABSTRACT

A flow control regulator assembly having a regulator body with an inflow channel that couples an inlet of the regulator body to a flow rate port and an exit flow channel which couples the flow rate port to an outlet port of the regulator body. The minimal cross-sectional area of the exit flow channel is larger than the maximum cross-sectional area of the inflow channel.

16 Claims, 4 Drawing Sheets

GAS FLOW REGULATOR WITH MULTIPLE GAS FLOW PASSAGES

BACKGROUND OF THE INVENTION

Field of the Invention

Devices, systems, and methods consistent with the invention relate to a method and apparatus for providing an integral gas flow regulator and flow meter.

Description of the Related Art

During certain types of welding operations, such as gas metal arc welding (GMAW) a shielding gas is used. These shielding gases can be argon or carbon dioxide, for example. The shielding gases are typically delivered to the welding operation from a high pressure tank or gas source (can be as high as 3,000 psi). Although the pressure of the source of the gas is high, the pressure of the gas needed at the welding operation is considerably lower, typically between 10 and 50 psi. Further, it is typically required that the flow rate of the shielding gas at the weld be controlled to be a constant flow rate. Because of this, it is typically necessary to have a gas flow regulator and gas flow meter in the gas flow line between the source of the gas (e.g., tank) and the welding operation. Typically, each of the gas flow regulator and flow meter are separate components, thus requiring no less than two different devices to be connected to the gas line. This increases the cost and complexity of using gas.

BRIEF SUMMARY OF THE INVENTION

An exemplary embodiment of the present invention is a gas flow regulator assembly having a regulator body with a cavity coupled to a gas inlet port, a valve assembly coupled to a flow valve assembly coupled to a flow valve port. The valve assembly controls a flow of a gas in the regulator body. The assembly additionally has a pressure gauge assembly coupled to a pressure gauge port, a flow monitoring assembly which monitors a flow rate of the gas flowing through flow monitoring assembly and coupled to a flow rate port, and an outlet port through which said gas exits said regulator body. The regulator body also has an inflow channel which provides for a flow of at least some of the gas from said the inlet port to the flow rate port, and an exit flow channel which couples the flow rate port to the outlet port to flow the gas to the outlet port, and where a minimum cross-sectional area of said exit flow channel is larger than a maximum cross-sectional area of said inflow channel.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
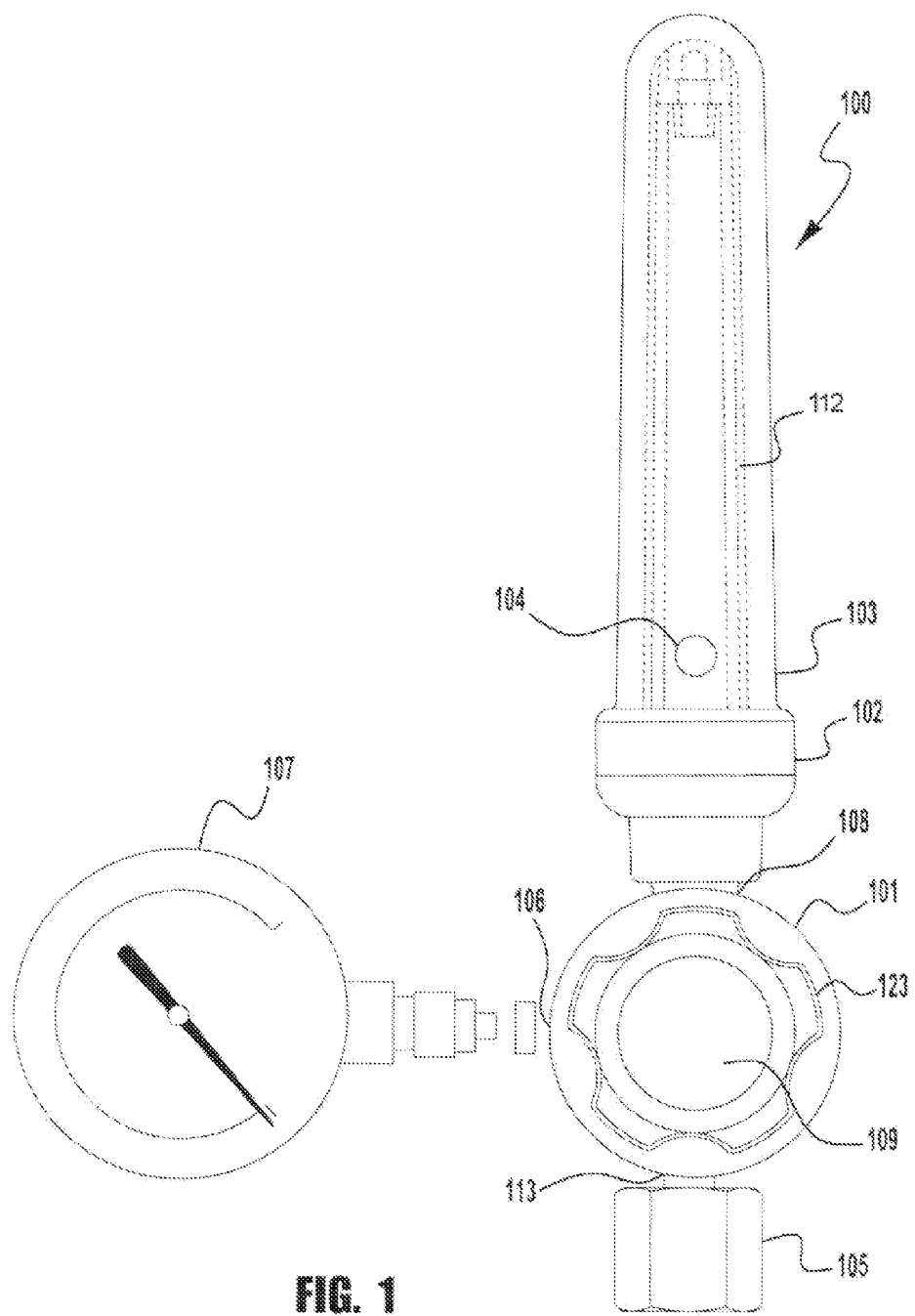
FIG. 1 illustrates a diagrammatical representation of an exemplary embodiment of a flow regulatory assembly of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 2:
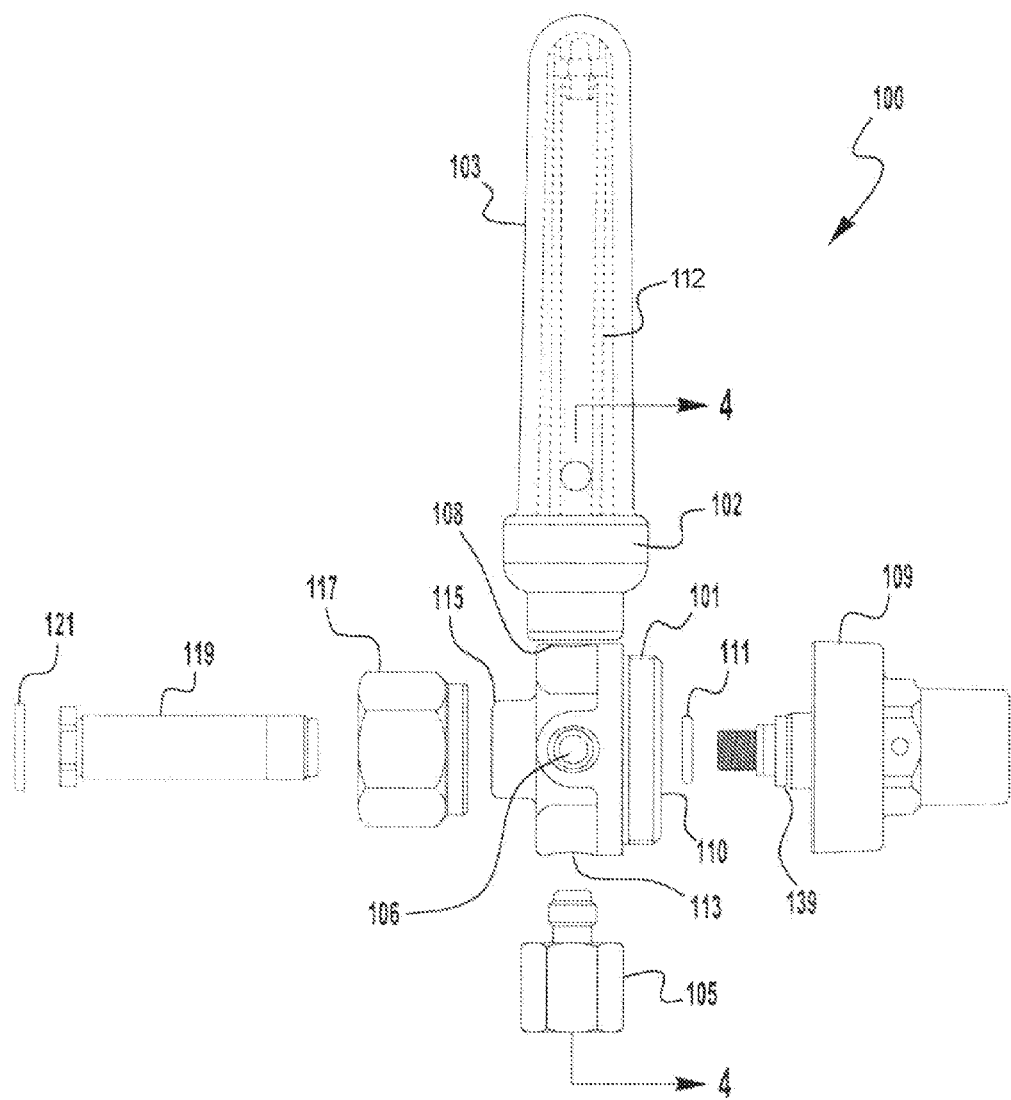
FIG. 2 illustrates an additional diagrammatical representation of an exemplary embodiment of a flow regulatory assembly of the present invention shown in FIG. 1.

Turning now to FIGS. 1 and 2, an exemplary embodiment of the present invention is shown. Specifically, an embodiment of the gas flow regulator assembly 100 of the present invention is depicted. The gas flow regulator assembly 100 contains a number of components, including a regulator body 101, a valve assembly 139 a pressure gauge 107, an outlet fitting 105 and a flow tube assembly 103. The gas flow regulator assembly 100 both controls the flow rate of a gas, such as argon (for example) as well as monitors the pressure of the gas from the gas source (such as a tank.) Embodiments of the present invention provide a constant gas flow rate independent of the pressure from the source of the gas.

Specifically, in prior art gas flow regulators when a welding process begins the gas flow at the outlet of the regulator can be as high as 20 or 30 psi because of a flow spike at the beginning of the process. This occurs because the pressure is allowed to build in the gas line while no operation or gas usage is occurring. After the initial burst of gas (at 20 to 30 psi) the pressure then drops to the operating pressure—which can be about 4 to 5 psi, for example. However, when using embodiments of the present invention, this initial "spike" is avoided and the desired operating pressure/flow rate is achieved during all stages of operation—that is from the initial start up to the stoppage of flow. This is highly advantageous in many different applications, including welding.

Turning again to FIGS. 1 and 2, the regulator body 101 can be made from any appropriate material for its intended use, including for example brass, but the present invention is not limited in this regard. The body 101 contains at least four threaded ports to which other components can be connected. A gas flows into the body 101 through the inlet port 115. The present invention is not limited by the source of the gas being provided to the inlet port, but can be tanks or compressor type systems. The inlet port 115 is coupled to a cavity 150 such that the inlet port 115 is in gas flow communication with the cavity 150.

The valve port 110 accepts the gas flow valve 139 which is part of the regulator 109. In the embodiment shown the gas flow valve 139 is actuated by a diaphragm type regulator which is adjustable allowing a user to adjust the amount of gas flow needed for a particular operation. Although a diaphragm type gas regulator is shown, other types of known gas flow type valves can be used, including for example piston type flow valves. The pressure or flow is adjusted with the use of a knob 123 (not shown in FIG. 2). The gas flow valve 139 is inserted into regulator body at port 110 and can be threaded so as to allow for the threading of the valve 139 into the port 110. The valve port 110 is also coupled to the cavity 150 so that the flow of gas from the inlet port 115 can be controlled by the flow valve 139. The construction and operation of gas flow regulators 109 are well known by those in the art and will not be discussed in detail herein.

The body 101 also has a flow tube port 108. Coupled to the flow tube port 108 is a flow tube assembly 103. The flow tube assembly 103 monitors the flow rate of the gas being regulated by the assembly 100. In the exemplary embodiment depicted in FIGS. 1 and 2 the flow tube assembly 103 contains a flow tube ball 104 inside the flow tube 112. The flow ball 104 is pushed up from a seated position as gas flows and the height of the ball relates to the flow rate of gas through the flow tube assembly. The flow tube assembly 103 is coupled to the body 101 with a flow tube adapter 102. The flow tube port is coupled to the cavity 150 such that the flow of gas from the inlet port 115 is directed to the flow tube port 108. A more detailed discussion of this is set forth below regarding FIG. 4. During operation, the gas flows into the flow tube assembly into a central chamber having the ball 104. The gas flow pushes up on the ball 104 and flows around the ball 104. After the gas flows around the ball 104 the gas is redirected back into the body 101 and to the outlet port 113 of the body 101. The present invention is not limited by the construction of the flow tube assembly 103, and any known construction may be utilized.

After the gas flow is directed back into the body 101 from the flow tube assembly 103 it is directed to the outlet port 113 and then to the work site, which can include a welding operation for example.

The body 101 also contains a pressure gauge port 106. A pressure gauge 107 is coupled to the pressure gauge port 106 and monitors the gas pressure from the source, such as a gas tank (not shown). This allows a user to determine the amount of gas remaining in the source to ensure that it is sufficient for the desired use of the gas. The present invention is not limited by the construction and configuration of the pressure gauge 107. Any known construction can be employed. The pressure gauge port 106 is coupled to the inlet port 115 so that the source pressure can be accurately determined by the pressure gauge 107.

In an exemplary embodiment of the present invention, an inlet port nut 117, inlet port stem 119 and inlet port gasket 121 can be coupled to the inlet port 115 to facilitate connection with a gas source. The present invention is not limited in this regard.

In FIG. 2 a seal 111 is shown to allow for the sealing of the flow valve 139 to the body 101. However, any suitable sealing method or means can be employed to achieve a leak proof seal between the flow valve 139 and the body 101.

Figure 3:
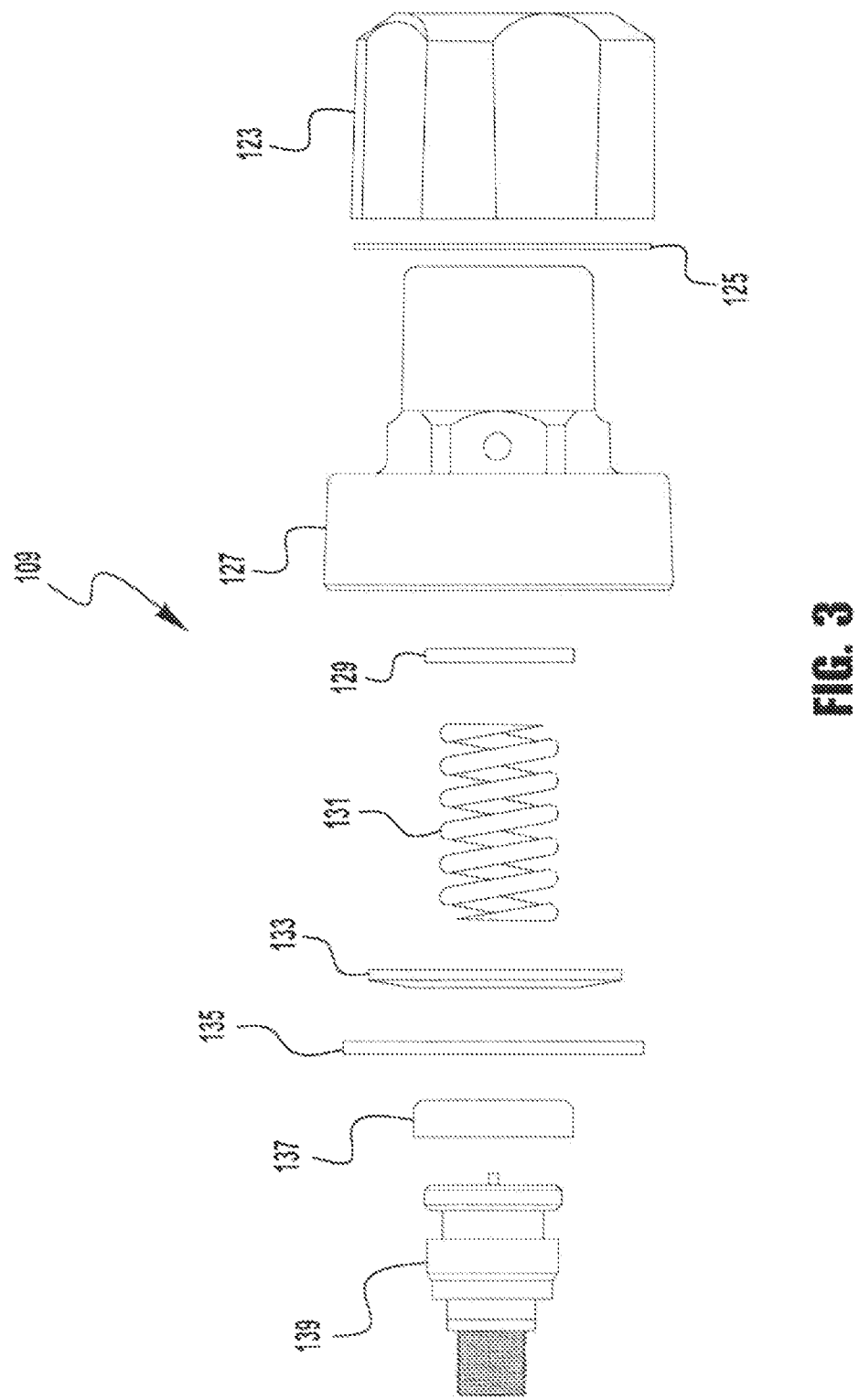
FIG. 3 illustrates a diagrammatical representation of a flow valve assembly employed in an exemplary embodiment of the present invention.

Turning now to FIG. 3 an exemplary embodiment of a flow regulator assembly 109 of the present invention is shown. As stated previously, the present invention is not limited to the construction of the valve 109 shown in FIG. 3 and any flow control valve type or structure can be employed. In the depicted embodiment, the flow valve assembly 109 contains a valve portion 139 which can be threaded or secured to the regulator body 101. Coupled to the valve portion 139 is a cap 137 and a diaphragm 135, which is flexible to allow its shape to change depending on the positioning of the knob 123. Spring 131 abuts the plate 133 and pivot plate 129. Finally the bonnet 127, identification plate 125 and knob 123 are secured to the valve assembly 109. As the knob 123 is rotated by a user the compressive force applied by the spring 131 to the plate 133 and diaphragm 135 changes. This change results in a change of shape of the diaphragm which changes an amount of gas flow from the inlet port 115 to the flow tube port 108, resulting the regulation of the flow. The operation and construction of a flow valve 109 is well understood by those of ordinary skill in the art.

Figure 4:
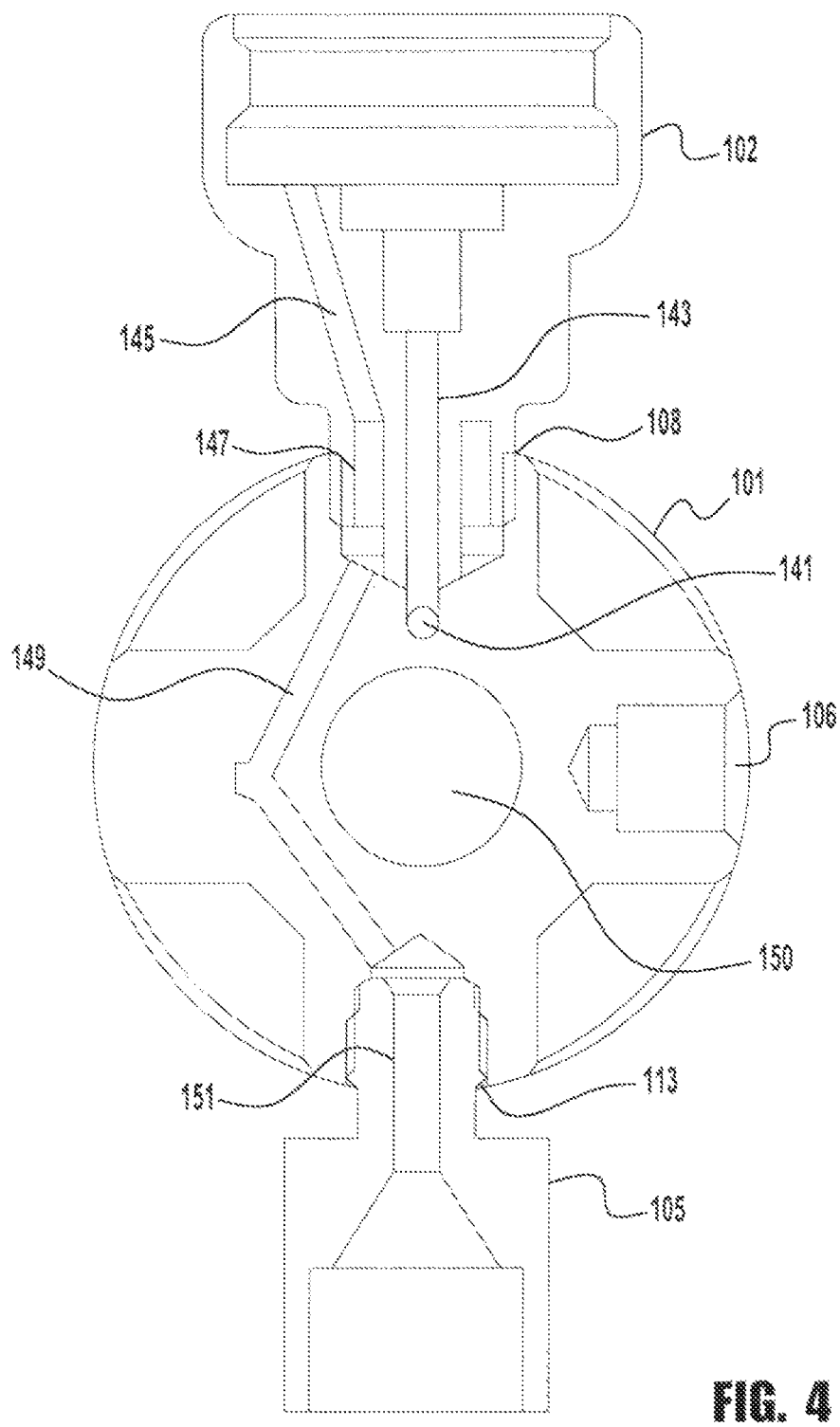
FIG. 4 illustrates a diagrammatical representation of a cross-section of a regulator body in accordance with an exemplary embodiment of the present invention.

Turning now to FIG. 4 a cross-section of the body 101 is depicted. As discussed previously, within the body 101 is the cavity 150. The inlet port 115 and the valve port 110 are not shown in this view. Further, as discussed above, the inlet port 115 is coupled to the flow tube port 108 via the cavity 150 so that the gas can flow from the inlet port 115 to the flow tube assembly 103 after its flow has been regulated by the valve assembly 109. The gas flows to the flow tube port 108 via the inflow channel 141 from in the body 101. The channel can be of any shape, and in the shown exemplary embodiment it is circular in cross-section. Further, the present invention is not limited to the positioning of the channel 141 within the body 101. The flow tube fitting 102 also has a channel 143 which engages with the channel 141 in the body 101 when the adaptor 102 is secured within the body 101. The channel 143 allows the gas to flow from port 108 into the center tube of the flow tube assembly 103 that contains the ball 104. As stated previously the gas then travels back from the flow tube assembly 103 into the fitting 102. In the fitting 102 the returning gas flows through the gas return channel 145. The gas return channel 145 directs the returning gas to a groove or annulus shaped chamber 147 in the fitting 102. In an exemplary embodiment the fitting chamber 147 can be in the configuration of a trepan groove. In an exemplary embodiment the chamber 147 is shaped as a complete annulus around the center of the fitting 102. This is done to ensure that the chamber 147 provides unobstructed flow connection between the channel 145 and the flow exit channel 149 in the body 101. By employing an annulus shape, regardless of the positioning of the fitting 102 after installation the channel 145 will be in communication with the channel 149 in the body. The present invention is not limited with respect to the shape and positioning of the exit flow channel 149 in the body 101.

The exit flow channel 149 couples the flow tube port 108 with the exit port 113 and the outlet fitting 105. The outlet fitting 105 is typically coupled to a hose or other means to direct the gas flow to the work site. The outlet fitting has an outlet channel 151 which couples to the channel 149 to allow for the gas flow to exit the outlet fitting 105. The outlet channel 151 is shown in FIG. 4 in the center of the fitting 105. However, the present invention is not limited in this regard, as the outlet channel can also have a chamber similar to the chamber 147 in the fitting 102.

In an exemplary embodiment of the present invention the minimum cross-sectional area of any of the channel 145, chamber 147, channel 149, channel 141 and channel 151 is larger than the maximum cross-sectional area of the channel 143. Stated differently, each of the channel 145, chamber 147, channel 149, channel 141 and channel 151 have a minimum cross-sectional area which is larger than the largest cross-sectional area in the channel 143. This is to ensure that the gas flow rate of the gas in the channel 145; chamber 147, channel 149, channel 141 and channel 151 does not restrict the gas flow rate in the channel 143 and ensure that the flow rate is regulated properly and in accordance with the attributes described above.

In a further exemplary embodiment, the minimum cross-sectional area in each of the channel 145, chamber 147, channel 149, channel 141 and channel 151 is at least 15% larger than the maximum cross-sectional area for the channel 143. In further exemplary embodiments the minimum cross-sectional area in each of the channel 145, chamber 147, channel 149, channel 141 and channel 151 is 10 to 30% larger than the maximum cross-sectional area for the channel 143.

It is noted that the present invention is not limited to the use of the flow regulator assembly, but can be used with in any industry or application requiring the regulation of gas flow.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A gas flow regulator assembly, comprising:
 a regulator body having a cavity coupled to a gas inlet port;
 a valve assembly coupled to a flow valve port, where said valve assembly controls a flow of a gas in said regulator body;
 a pressure gauge assembly coupled to a pressure gauge port;
 a flow monitoring assembly which monitors a flow rate of said gas flowing through said flow monitoring assembly and coupled to a flow rate port;
 a flow monitoring assembly adapter which couples said flow monitoring assembly to said flow rate port and has an entry channel through said adapter; and
 an outlet port through which said gas exits said regulator body;
 wherein said regulator body further comprises an inflow channel which provides for a flow of at least some of said gas from said gas inlet port to said flow rate port and said entry channel after said flow has been regulated by said valve assembly, and an exit flow channel which couples said flow rate port to said outlet port to flow said at least some of said gas to said outlet port, and
 wherein a minimum cross-sectional area of said exit flow channel is larger than a maximum cross-sectional area of said entry channel.

2. The gas flow regulator assembly of claim 1, wherein said minimum cross-sectional area of said exit flow channel is at least 15% larger than said maximum cross-sectional area of said entry channel.

3. The gas flow regulator assembly of claim 1, wherein said minimum cross-sectional area of said exit flow channel is 10% to 30% larger than said maximum cross-sectional area of said entry channel.

4. The gas flow regulator of claim 1, wherein said minimum cross-sectional area of said exit flow channel and a minimum cross-sectional area of said inflow channel are both at least 15% larger than said maximum cross-sectional area of said entry channel.

5. The gas flow regulator of claim 1, wherein said minimum cross-sectional area of said exit flow channel and a minimum cross-sectional area of said inflow channel are both 10% to 30% larger than said maximum cross-sectional area of said entry channel.

6. The gas flow regulator of claim 1, wherein said flow monitoring assembly adapter further comprises a return channel, and a return chamber which is coupled to said exit flow channel.

7. The gas flow regulator of claim 6, wherein said minimum cross-sectional area of said exit flow channel and a minimum cross-sectional area of said return channel are both at least 15% larger than said maximum cross-sectional area of said entry channel.

8. The gas flow regulator of claim 6, wherein said minimum cross-sectional area of said exit flow channel and a minimum cross-sectional area of said return channel are both 10% to 30% larger than said maximum cross-sectional area of said entry channel.

9. A gas flow regulator body, comprising:
 a regulator body having a cavity coupled to a gas inlet port;
 a flow valve port coupled to said cavity, said flow valve port configured to accept a valve assembly that regulates a flow of a gas in said regulator body;
 a flow rate port through which said gas is flowed to measure a flow rate of said gas;
 a flow monitoring assembly adapter which is coupled to said flow rate port and having an entry channel through said adapter; and
 an outlet port through which said gas can exit said regulator body;
 wherein said regulator body further comprises an inflow channel which provides for a flow of at least some of said gas from said gas inlet port to said flow rate port and said entry channel, and an exit flow channel which couples said flow rate port to said outlet port to flow said at least some of said gas to said outlet port, and
 wherein a minimum cross-sectional area of said exit flow channel is larger than a maximum cross-sectional area of said entry channel.

10. The gas flow regulator assembly of claim 9, wherein said minimum cross-sectional area of said exit flow channel is at least 15% larger than said maximum cross-sectional area of said entry channel.

11. The gas flow regulator assembly of claim 9, wherein said minimum cross-sectional area of said exit flow channel is 10% to 30% larger than said maximum cross-sectional area of said entry channel.

12. The gas flow regulator of claim 9, wherein said minimum cross-sectional area of said exit flow channel and a minimum cross-sectional area of said inflow channel are both at least 15% larger than said maximum cross-sectional area of said entry channel.

13. The gas flow regulator of claim 9, wherein said minimum cross-sectional area of said exit flow channel and a minimum cross-sectional area of said inflow channel are both 10% to 30% larger than said maximum cross-sectional area of said entry channel.

14. The gas flow regulator of claim 9, wherein said flow monitoring assembly adapter further comprises a return channel, and a return chamber which is coupled to said exit flow channel.

15. The gas flow regulator of claim 14, wherein said minimum cross-sectional area of said exit flow channel and a minimum cross-sectional area of said return channel are both at least 15% larger than said maximum cross-sectional area of said entry channel.

16. The gas flow regulator of claim 14, wherein said minimum cross-sectional area of said exit flow channel and a minimum cross-sectional area of said return channel are both 10% to 30% larger than said maximum cross-sectional area of said entry channel.

* * * * *